US009443684B2

(12) United States Patent
Lim

(10) Patent No.: US 9,443,684 B2
(45) Date of Patent: Sep. 13, 2016

(54) CHARGING AND DISCHARGING CONTROL APPARATUS OF DC LINK CAPACITOR IN ELECTRIC POWER STEERING RELAY AND METHOD THEREOF

(71) Applicant: MANDO CORPORATION, Pyeongtaek-si, Gyeonggi-do (KR)

(72) Inventor: Tae Seo Lim, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 396 days.

(21) Appl. No.: 14/089,333

(22) Filed: Nov. 25, 2013

(65) Prior Publication Data

US 2014/0153151 A1 Jun. 5, 2014

(30) Foreign Application Priority Data

Dec. 4, 2012 (KR) ........................ 10-2012-0139298

(51) Int. Cl.
*H01H 47/26* (2006.01)
*H02H 1/00* (2006.01)

(52) U.S. Cl.
CPC .................................... *H01H 47/26* (2013.01)

(58) Field of Classification Search
CPC ........................................................ H02H 1/00
USPC ........................................................ 307/10.1
See application file for complete search history.

(56) References Cited

U.S. PATENT DOCUMENTS

2002/0057015 A1* 5/2002 Kikuta ................. B62D 5/0457
307/10.1

FOREIGN PATENT DOCUMENTS

CN 202495800 U 10/2012
KR 10-2009-0063518 A 6/2009

OTHER PUBLICATIONS

Chinese Office Action dated Jul. 3, 2015 in connection with the counterpart Chinese Patent Application No. 201310646469.8.

* cited by examiner

*Primary Examiner* — Robert DeBeradinis
(74) *Attorney, Agent, or Firm* — Hauptman Ham, LLP

(57) ABSTRACT

Exemplary embodiments of the present invention relate to a charging and discharging apparatus of a DC link capacitor in an electric power steering relay, in which the DC link capacitor turning-on the electric power steering relay includes at least two switching elements charged or discharged by a collector current so as not to relay on an internal temperature, facilitates a circuit design, and meets an electronic control system which applies time constants in a lump using software, and a method thereof.

13 Claims, 8 Drawing Sheets

--PRIOR ART--

FIG. 6

| battery voltage \ temperature | ~40° C ~ 0° C (low temperature) | 0° C ~ 25° C (normal temperature) | 25° C ~ 50° C (high temperature) |
|---|---|---|---|
| ~ 9V | 20% | 30% | 40% |
| 9V ~ 16V | 30% | 40% | 50% |
| 16V ~ | 40% | 50% | 60% |

CHARGING AND DISCHARGING CONTROL APPARATUS OF DC LINK CAPACITOR IN ELECTRIC POWER STEERING RELAY AND METHOD THEREOF

CROSS-REFERENCE(S) TO RELATED APPLICATIONS

This application claims priority to Korean Patent Application No. 10-2012-0139298, filed on Dec. 4, 2012, which is incorporated herein by reference in its entirety.

BACKGROUND OF THE INVENTION

1. Field of the Invention

Exemplary embodiments of the present invention relate to a charging and discharging control apparatus of a DC link capacitor in an electric power steering relay and a method thereof, and more particularly, to a charging and discharging apparatus of a DC link capacitor in an electric power steering relay, in which the DC link capacitor turning-on the electric power steering relay includes at least two switching elements charged or discharged by a collector current so as not to relay on an internal temperature, facilitates a circuit design, and meets an electronic control system using software, and a method thereof.

2. Description of Related Art

An electric control unit (ECU) in an electric power steering (EPS) is connected to a relay for fail-safety of units, and charges a DC link capacitor which is located at a latter stage of the relay so as to prevent a burning of the relay due to an inrush current when the relay is turned-on.

In this case, in order to prevent the burning of the relay due to overcharging of the DC link capacitor, the DC link capacitor needs to be completely discharged, prior to being charged.

FIG. 1 is a circuit diagram illustrating a charging-discharging control apparatus 10 of a DC link capacitor in an electric power steering relay in accordance with the related art.

Referring to FIG. 1, the charging-discharging control apparatus 10 of a DC link capacitor in an electric power steering relay in accordance with the related art includes a charging switch Q2 and a discharging switch Q3 for a DC link capacitor C, a control unit 2 configured to control the charging switch Q2 and the discharging switch Q3 using a PWM signal, and a resistor unit 4 configured to control a charging-discharging time, along with the DC link capacitor C. In this case, a capacitance of the DC link capacitor C is determined depending on a maximum current of the ECU and a time constant thereof is determined depending on a circuit design.

That is, since the capacitance of the DC link capacitor varies depending on the current capacity of the current ECU, the charging and/or discharging resistance values within the circuit are set differently and since the charging/discharging current amount may not be determined, the charging time and the discharging time are set for each ECU in a lump.

However, the related art has the following problems.

First, when the maximum current of the ECU is increased, the capacitance of the DC link capacitor is increased and thus the resistance value is reduced to keep the same time constant, thereby making it difficult to design a circuit.

Second, when the internal temperature of the ECU rises, power is reduced at the resistor unit, such that a resistor having a high power factor needs to be used. To this end, the related art uses a method of increasing power while reducing the resistance value, by configuring the resistor unit in which at least two resistors are connected to each other in parallel.

The related art is difficult to design a sharing circuit, needs to additionally connect a resistor as the internal temperature of the ECU is increased, and does not meet an electronic control system which applies preset time constants in a lump using software.

Finally, the related art may not cope with the change in the internal temperature of the ECU on which the DC link capacitance relies, such that the DC link capacitor may be overcharged at low temperature and undercharged at a high temperature.

RELATED ART DOCUMENT

Patent Document (Patent Document 1) Korean Patent Laid-Open Publication No. 10-2009-0063516

SUMMARY OF THE INVENTION

An embodiment of the present invention is directed to a charging and discharging control apparatus of a DC link capacitor in an electric power steering relay and a method thereof to solve a difficulty in a circuit design depending on temperature, as in a case in which there is a need to reduce a resistance value so as to keep the same time constant when a maximum current of an ECU is increased.

Another embodiment of the present invention is directed to a charging and discharging control apparatus of a DC link capacitor in an electric power steering relay and a method thereof to solve a problem in that they does not meet electronic control system which applies time constants in a lump using software by changing a resistance each time an internal temperature of an ECU is changed.

Still another embodiment of the present invention is directed to a charging and discharging control apparatus of a DC link capacitor in an electric power steering relay and a method thereof to solve a problem in that DC link capacitance relies on a change in the internal temperature of an ECU.

In accordance with an embodiment of the present invention, a charging-discharging control apparatus of a DC link capacitor in an electric power steering relay, includes: a DC link capacitor configured to turn-on the electric power steering relay by charging an electric charge, a first switching unit configured to control charging of the DC link capacitor by being shorted between the DC link capacitor and a power supply unit; and a second switching unit configured to control discharging of the DC link capacitor by being shorted between the DC link capacitor and a ground, wherein the first switching unit includes at least one transistor to control the charging of the DC link capacitor using a collector current thereof and the second switching unit includes at least one transistor to control the discharging of the DC link capacitor using a collector current thereof.

The first switching unit may include: a first transistor configured to be connected to the power supply unit through a first resistor; and a second transistor configured to be connected to the first transistor through a second resistor to control a current flowing in the DC link capacitor from the power supply unit using the first transistor.

The second switching unit may include: a third transistor configured to be connected to the DC link capacitor through a third resistor; and a fourth transistor configured to be connected to the third transistor through a fourth resistor to control a current flowing in the ground from the DC link capacitor using the third transistor.

A collector of the second transistor may be connected to a base of the first transistor, when a charging signal is input to a base of the second transistor, the first transistor may be turned-on so that the power supply unit is shorted with the DC link capacitor, and when the charging signal is not input to the base of the second transistor, the first transistor may be turned-off so that the power supply unit and the DC link capacitor are opened.

A collector of the fourth transistor may be connected to a base of the third transistor, when a discharging signal is input to a base of the fourth transistor, the third transistor may be turned-on so that the DC link capacitor is shorted with the ground, and when the discharging signal is not input to the base of the fourth transistor, the third transistor may be turned-off so that the DC link capacitor and the ground are opened.

The charging-discharging control apparatus may further include: a control unit configured to connect the base of the second transistor to the base of the fourth transistor and control switching of the first transistor and the third transistor using the charging signal and the discharging signal depending on a preset duty.

The duty may be preset depending on temperature and a voltage of the power supply unit.

The DC link capacitor may be completely discharged by the discharging signal input to the fourth transistor prior to turning-on the relay and may be charged by the charging signal input to the second transistor to turn-on the relay.

In accordance with another embodiment of the present invention, a method of a charging-discharging control of a DC link capacitor in an electric power steering relay includes: a first step of measuring a voltage of a power supply unit and an internal temperature; a second step of determining a discharging duty depending on the measured voltage and the internal temperature; a third step of discharging the DC link capacitor by a discharging switching unit depending on the discharging duty; a fourth step of charging the DC link capacitor by a charging switching unit; and a fifth step of turning-on the electric power steering relay.

The method of a charging-discharging control of a DC link capacitor in an electric power steering relay may further including: prior to the first step, setting the duty and storing the set duty in a lookup table so as to discharge the DC link capacitor depending on the voltage of the power supply unit and the internal temperature.

In the third step, switching of a switching element which controls discharging of the DC link capacitor may be controlled by the switching element using the discharging duty as an input.

In the third step, the DC link capacitor may be completely discharged.

The method of a charging-discharging control of a DC link capacitor in an electric power steering relay may further include: prior to the fourth step, a 4-1-th step of measuring the voltage of a power supply unit and the internal temperature; a 4-2-th step of setting a duty and storing the set duty in a lookup table so that the DC link capacitor is charged depending on the measured voltage and the internal temperature; and a 4-3-th step of determining a charging duty depending on the measured voltage and the internal temperature.

In the fourth step, switching of a switching element which controls charging of the DC link capacitor may be controlled by the switching element using the charging duty as an input.

In the fourth step, the DC link capacitor may be charged with a preset voltage.

BRIEF DESCRIPTION OF THE DRAWINGS

FIG. 6 is a duty table depending on a battery voltage and an internal temperature of an ECU.

DESCRIPTION OF SPECIFIC EMBODIMENTS

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode. Therefore, configurations described in embodiments and shown in drawings of the present specification indicate only the most preferred example rather than indicating all the technical ideas of the present invention and therefore, it is to be understood that various equivalents and modifications that can replace the above configurations may be present.

Terms used in the present specification are for explaining the embodiments rather than limiting the present invention. Unless explicitly described to the contrary, a singular form includes a plural form in the present specification.

Hereinafter, embodiments of the present invention will be described in detail with reference to the accompanying drawings.

Figure 1:
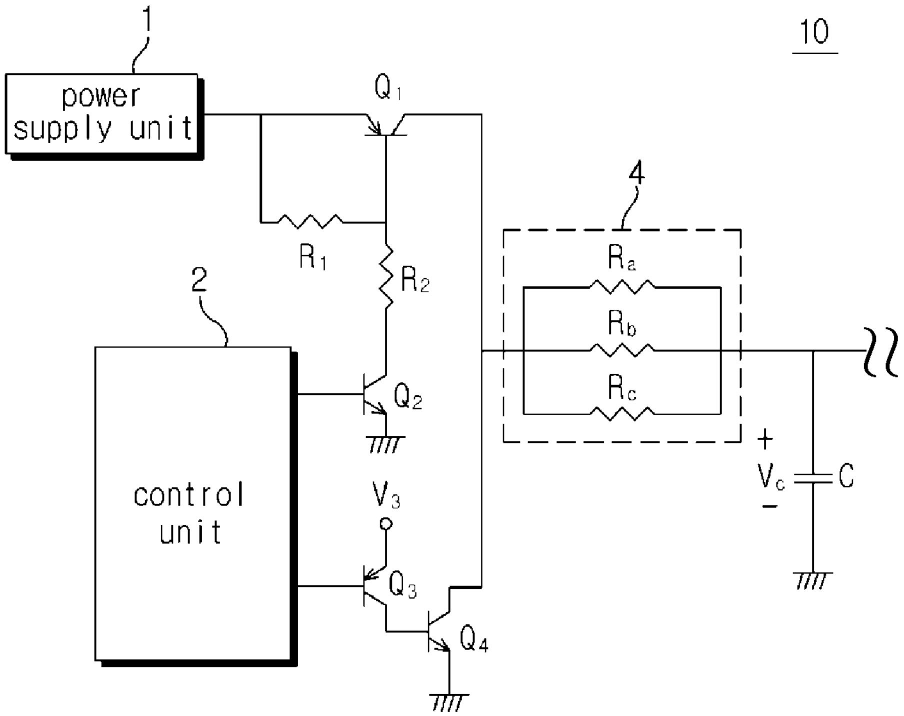
FIG. 1 is a circuit diagram illustrating a charging-discharging control apparatus of a DC link capacitor in an electric power steering relay in accordance with the related art.
Figure 2:
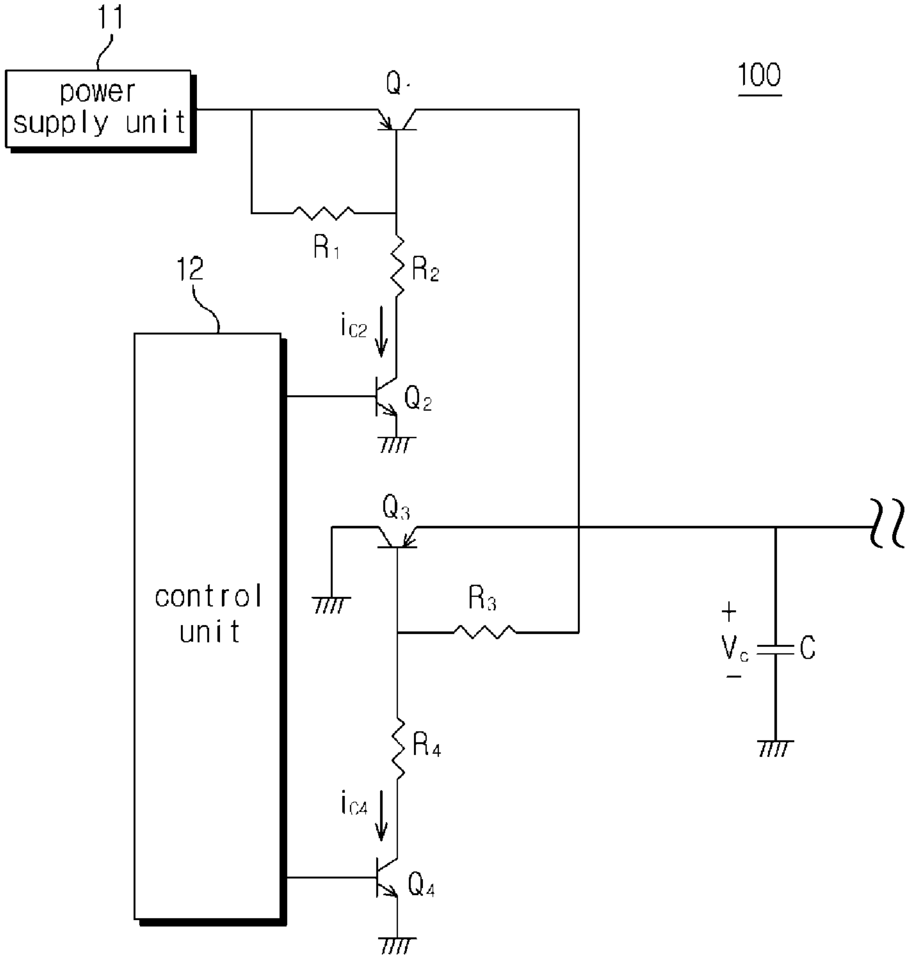
FIG. 2 is a circuit diagram illustrating a charging-discharging control apparatus of a DC link capacitor in an electric power steering relay in accordance with an embodiment of the present invention.
Figure 3:
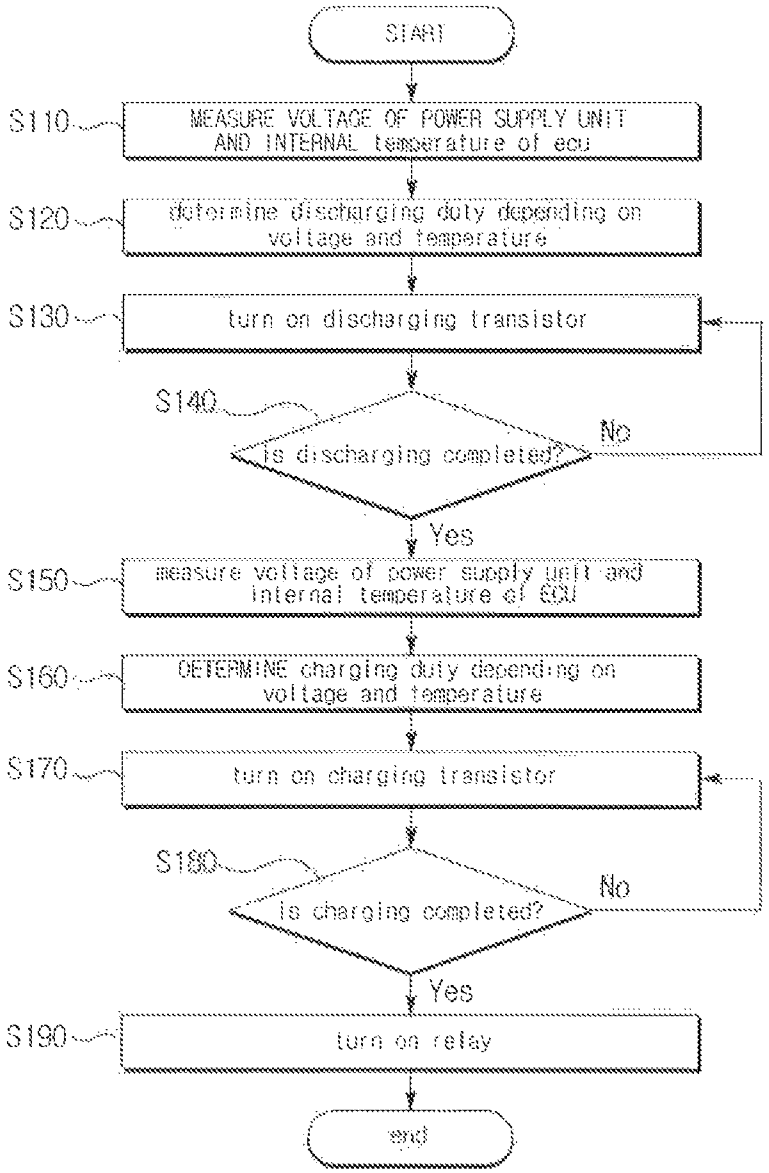
FIG. 3 is a flow chart of a charging-discharging control method of a DC link capacitor in an electric power steering relay in accordance with an embodiment of the present invention.

FIG. 2 is a circuit diagram illustrating a charging-discharging control apparatus of a DC link capacitor in an electric power steering relay in accordance with an embodiment of the present invention and FIG. 3 is a flow chart of a charging-discharging control method of a DC link capacitor in an electric power steering relay in accordance with an embodiment of the present invention.

The charging-discharging control apparatus of a DC link capacitor C in an electric power steering relay in accordance with the embodiment of the present invention includes a DC link capacitor C configured to turn-on the electric power steering relay by charging an electric charge, a first switching unit configured to control charging of the DC link capacitor C by being shorted between the DC link capacitor C and a power supply unit 11, and a second switching unit configured to control discharging of the DC link capacitor C by being shorted between the DC link capacitor C and a ground, in which the first switching unit includes at least one transistor to control the charging of the DC link capacitor C using a collector current thereof and the second switching unit includes at least one transistor to control the discharging of the DC link capacitor C using a collector current thereof.

The DC link capacitor C may be to prevent a burning of the relay for fail-safety of units in en electric control unit (ECU) of an electric power steering (EPS). Herein, the relay may be a mechanical relay and when the relay is turned-on, the DC link capacitor which is located at a latter stage of the relay is charged, such that the burning of the relay due to an inrush current may be prevented.

The first switching unit includes a first transistor Q1 and a second transistor Q2. A collector of the first transistor Q1 may be connected to the power supply unit 11 and an emitter of the first transistor Q1 may be connected to the DC link capacitor C. A base of the second transistor Q2 may be connected to a control unit 12, a collector of the second transistor Q2 may be connected to a base of the first transistor Q1, and an emitter of the second transistor Q2 may be grounded.

Therefore, in the charging-discharging control apparatus of a DC link capacitor C in an electric power steering relay in accordance with the embodiment of the present invention, the first switching unit includes the first transistor Q1 which is connected to the power supply unit 11 through a first resistor and the second transistor Q2 which is connected to the first transistor Q1 through a second resistor to control a current flowing in the DC link capacitor C from the power supply unit 11 using the first transistor Q1.

The second switching unit includes a third transistor Q3 and a fourth transistor Q4. A collector of the third transistor Q3 may be connected to the DC link capacitor C and an emitter of the third transistor Q3 may be grounded. A base of the fourth transistor Q4 may be connected to the control unit 12, a collector of the fourth transistor Q4 may be connected to a base of the third transistor Q3, and an emitter of the fourth transistor Q4 may be grounded.

Therefore, in the charging-discharging control apparatus of a DC link capacitor C in an electric power steering relay in accordance with the embodiment of the present invention, the second switching unit includes the third transistor Q3 which is connected to the DC link capacitor C through a third resistor and the fourth transistor Q4 which is connected to the third transistor Q3 through a fourth resistor to control the current flowing in the ground from the DC link capacitor C using the third transistor Q3.

The control unit 12 outputs a control signal for charging the DC link capacitor C. In this case, when the control unit 12 outputs a charging signal, the charging signal is input to the base of the second transistor Q2 and the first transistor Q1 is switched to electrically short the power unit 11 with the DC link capacitor C using a collector current of the second transistor Q2. That is, the DC link capacitor C may be charged by the collector current of the second transistor Q2 which receives the charging signal of the control unit 12.

Therefore, in the charging-discharging control apparatus of a DC link capacitor C in an electric power steering relay in accordance with the embodiment of the present invention, the first transistor Q1 is turned-on so that the power supply unit 11 and the DC link capacitor C are shorted with each other when the collector of the second transistor Q2 is connected to the base of the first transistor Q1 and the charging signal is input to the base of the second transistor Q2, and the first transistor Q1 is turned-off so that the power supply unit 11 and the DC link capacitor C are opened when the charging signal is not input to the base of the second transistor Q2.

The control unit 12 outputs a control signal for discharging the DC link capacitor C. In this case, when the control unit 12 outputs the discharging signal, the discharging signal is input to the base of the fourth transistor Q4 and the third transistor Q3 is switched to electrically short the ground with the DC link capacitor C using the collector current of the fourth transistor Q4. That is, the DC link capacitor C may be discharged by the collector current of the fourth transistor Q4 which receives the discharging signal of the control unit 12.

Therefore, in the charging-discharging control apparatus of a DC link capacitor C in an electric power steering relay in accordance with the embodiment of the present invention, the third transistor Q3 is turned-on so that the DC link capacitor C and the ground are shorted with each other when the collector of the fourth transistor Q4 is connected to the base of the third transistor Q3 and the discharging signal is input to the base of the fourth transistor Q4, and the third transistor Q3 is turned-off so that the DC link capacitor C and the ground are opened when the discharging signal is not input to the base of the fourth transistor Q4.

The control unit 12 is connected to the base of the second transistor Q2 and the base of the fourth transistor Q4 to be able to output the charging signal and the discharging signal. When the control unit 12 outputs the charging signal, the charging signal is input to the base of the second transistor Q2 to switch the first transistor Q1 and the signal is not input to the base of the fourth transistor Q4. When the control unit 12 outputs the discharging signal, the discharging signal is input to the base of the fourth transistor Q4 to switch the third transistor Q3 and the signal is not input to the base of the second transistor Q2. The charging signal and the discharging signal may be set as a duty by a PWM.

Therefore, the charging-discharging control apparatus of a DC link capacitor C in an electric power steering relay in accordance with the embodiment of the present invention further includes the control unit 12 configured to be connected to the base of the second transistor Q2 and the base of the fourth transistor Q4 and control the switching of the first transistor Q1 and the third transistor Q3 using the charging signal and the discharging signal by a preset duty. In this case, the duty is preset depending on temperature and a voltage of the power supply unit 11.

Figure 4A:
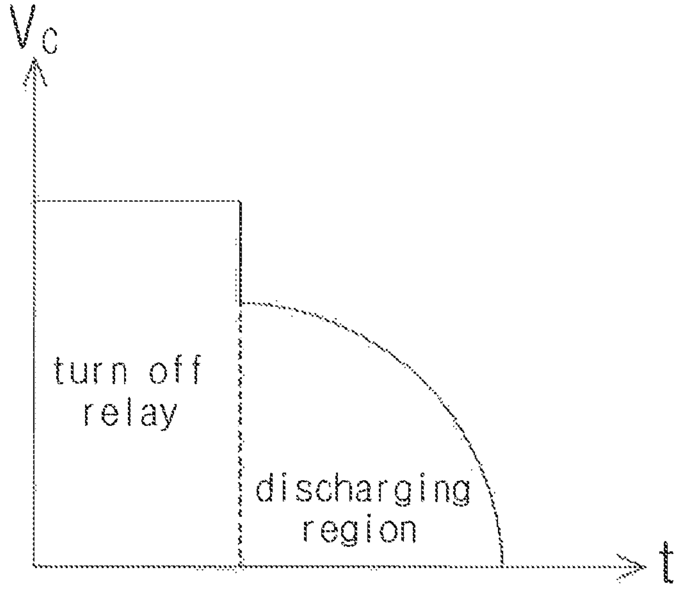
FIGS. 4A and 4B are comparison diagrams of discharging graphs of the DC link capacitor over time.
Figure 4B:
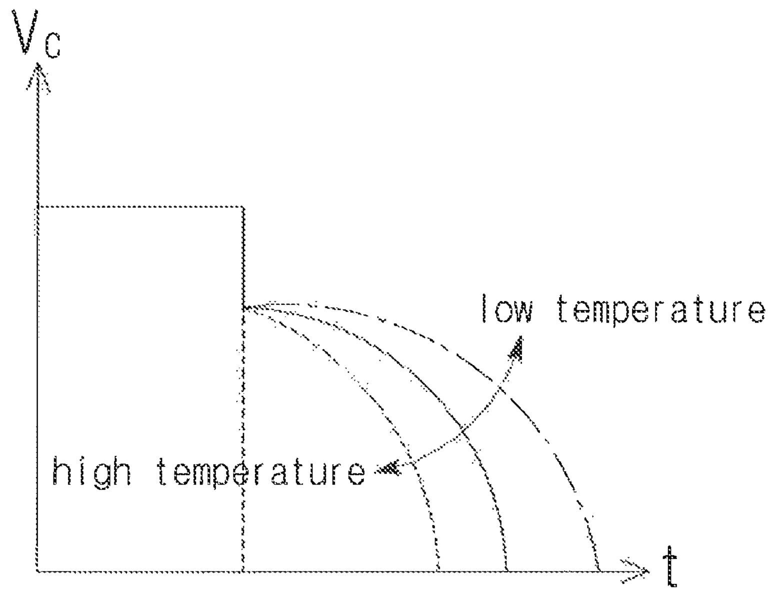
Figure 5A:
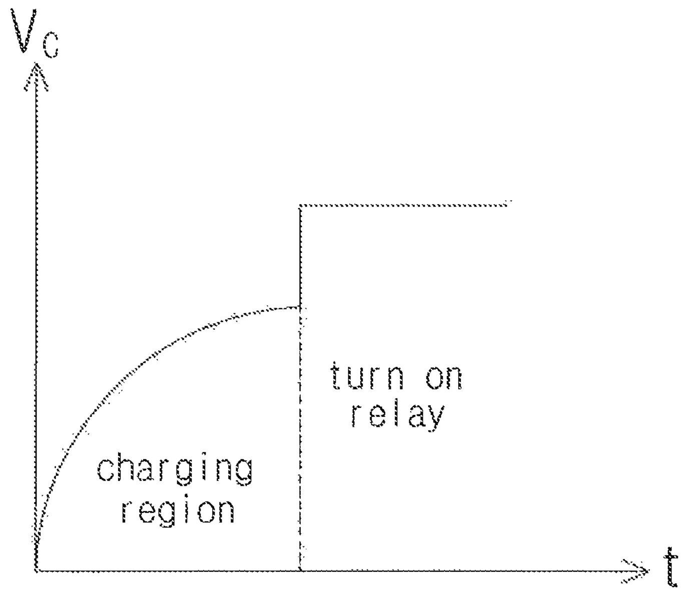
FIGS. 5A and 5B are comparison diagrams of charging graphs of the DC link capacitor over time.
Figure 5B:
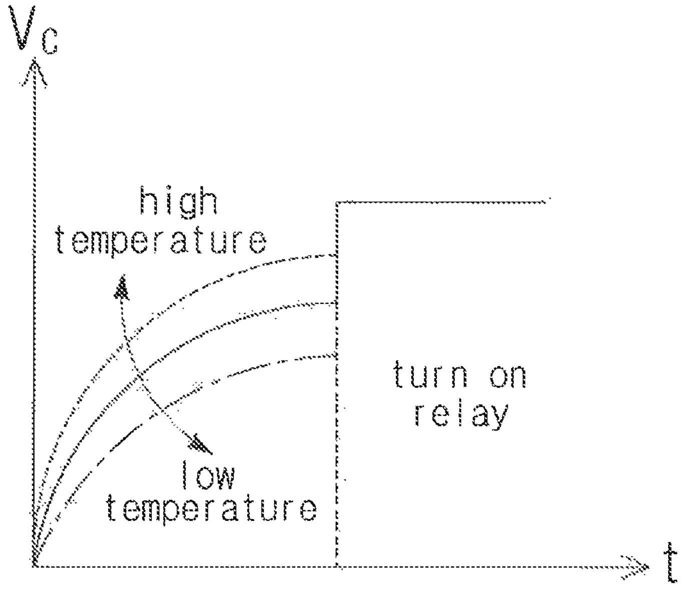

FIG. 4B is a graph of an electric charge discharged from the DC link capacitor C in the case in which the charging-discharging control apparatus of a DC link capacitor C in an electric power steering relay in accordance with the embodiment of the present invention is a discharging mode and FIG. 5B is a graph of an electric charge charged in the DC link capacitor C in the case in which the charging-discharging control apparatus of a DC link capacitor C in an electric power steering relay in accordance with the embodiment of the present invention is a charging mode. Further, FIG. 6 illustrates a duty table depending on the temperature and the voltage of the power supply unit 11.

Referring to FIG. 6, the voltage of the power supply unit 11 may mean the voltage of the battery and the temperature may mean the internal temperature of the charging-discharging control apparatus of a DC link capacitor C in an electric power steering relay in accordance with the embodiment of the present invention. Generally, when the temperature is 0° C. or less, the temperature may be set to be a low temperature and when the temperature is 25° C. or more, the temperature may be set to be a high temperature. Therefore, in accordance with the embodiment of the present invention, the optimal charging duty ratios which are set in each case of the low temperature, the normal temperature, and the high temperature are illustrated in FIG. 6.

The change in electric charge discharged in and charged from the DC link capacitor C due to the duty ratio is illustrated in FIGS. 4B and 5B, respectively. Therefore, in accordance with the embodiment of the present invention, the DC link capacitor C may be charged or discharged by setting the optimal duty ratio depending on the internal temperature and the voltage of the power supply unit 11 may also be considered.

Meanwhile, since the burning of the relay may occur due to the inrush current before the relay is turned-on, the DC link capacitor C needs to be charged and the DC link capacitor C needs to be completely discharged, prior to being charged. The reason is that when the DC link capacitor C is completely charged, the burning of the relay may occur. Therefore, in the charging-discharging control apparatus of a DC link capacitor C in an electric power steering relay in accordance with the embodiment of the present invention, the DC link capacitor C is completely discharged by the discharging signal input to the fourth transistor Q4 before the relay is turned-on and is charged by the charging signal input to the second transistor Q2 to turn-on the relay.

A charging-discharging control method of a DC link capacitor C in an electric power steering relay in accordance with the embodiment of the present invention includes a first step of measuring the voltage of the power supply unit and the internal temperature (S110), a second step of determining the discharging duty depending on the measured voltage and the internal temperature (S120), a third step of discharging the DC link capacitor by the discharging switching unit depending on the discharging duty (S130), a fourth step of charging the DC link capacitor by the charging switching unit (S170), and a fifth step of turning-on the electric power steering relay (S190). Hereinafter, the description of portions overlapping the foregoing description will be omitted.

Prior to S110, the charging-discharging control method may further include setting the duty to discharge the DC link capacitor depending on the voltage of the power supply unit and the internal temperature and storing the set duty in a lookup table. The lookup table may be previously set and stored in a storage device in the ECU and the setting of the optimal duty is as described above.

Therefore, the measuring of the internal temperature and the voltage of the power supply unit (S110) and the determining of the optimal duty ratio in the stored lookup table (S120) may be performed.

In S130, the switching of the switching device which controls the discharging of the DC link capacitor may be controlled by the switching device using the discharging duty as an input. That is, the DC link capacitor may be discharged depending on the duty determined in the lookup table by the internal temperature and the voltage of the power supply unit. In this case, the DC link capacitor may be completely discharged.

Next, a 4-1-th step of measuring the voltage of the power supply unit and the internal temperature (S150) may be performed, a 4-2-th step of setting the duty to charge the DC link capacitor depending on the measured voltage and the internal temperature and storing the set duty in the lookup table may be performed, and a 4-3-th step of determining the charging duty depending on the measured voltage and the internal temperature may be performed.

Therefore, a fourth step of controlling the switching of the switching device controlling the charging of the DC link capacitor using the charging duty as the input (S170) may be performed. In this case, the DC link capacitor may be charged with a preset voltage.

In accordance with the charging and discharging control apparatus of a DC link capacitor in an electric power steering relay and the method thereof in accordance with the embodiments of the present invention, the high power factor may not be kept by the resistor unit but may be controlled by the current of the charging switch and the discharging switch, thereby facilitating the circuit design despite the change in the internal temperature of the ECU.

In accordance with the charging and discharging control apparatus of a DC link capacitor in an electric power steering relay and the method thereof in accordance with the embodiments of the present invention, there is no need to change the resistance value of the resistor unit despite the change in the internal temperature of the ECU, such that they may meet the electronic control system using software.

In accordance with the charging and discharging control apparatus of a DC link capacitor in an electric power steering relay and the method thereof in accordance with the embodiments of the present invention, the DC link capacitance may not rely on the change in the internal temperature of the ECU.

In accordance with the charging and discharging control apparatus of a DC link capacitor in an electric power steering relay and the method thereof in accordance with the embodiments of the present invention, the current amount may be controlled for each targeted voltage and the circuits in the ECU may be shared.

In accordance with the charging and discharging control apparatus of a DC link capacitor in an electric power steering relay and the method thereof in accordance with the embodiments of the present invention, the charging current and/or the discharging current is controlled by controlling the on duty of the charging transistor and/or the discharging transistor, thereby determining the charging and/or discharging time for each temperature.

Although the present invention has been shown and described with the exemplary embodiments as described above, the present invention is not limited to the exemplary embodiments as described above, but may be variously changed and modified by those skilled in the art to which the present invention pertains without departing from the scope of the present invention, and the changes, substitutions, modifications, and the like are to be construed as belonging to claims of the present invention.

What is claimed is:

1. A charging-discharging control apparatus of a DC link capacitor in an electric power steering relay, comprising:

a DC link capacitor configured to turn-on the electric power steering relay by charging an electric charge, a first switching unit configured to control charging of the DC link capacitor by being shorted between the DC link capacitor and a power supply unit; and a second switching unit configured to control discharging of the DC link capacitor by being shorted between the DC link capacitor and a ground, wherein the first switching unit includes at least one transistor to control the charging of the DC link capacitor using a collector current thereof, and the second switching unit includes at least one transistor to control the discharging of the DC link capacitor using a collector current thereof, wherein the first switching unit includes:

a first transistor configured to be connected to the power supply unit through a first resistor; and a second transistor configured to be connected to the first transistor through a second resistor to control a current flowing in the DC link capacitor from the power supply unit using the first transistor, and wherein the second switching unit includes:

a third transistor configured to be connected to the DC link capacitor through a third resistor; and a fourth transistor configured to be connected to the third transistor through a fourth resistor to control a current flowing in the ground from the DC link capacitor using the third transistor.

2. The charging-discharging control apparatus of claim 1, wherein a collector of the fourth transistor is connected to a base of the third transistor, when a discharging signal is input to a base of the fourth transistor, the third transistor is turned-on so that the DC link capacitor is shorted with the ground, and when the discharging signal is not input to the base of the fourth transistor, the third transistor is turned-off so that the DC link capacitor and the ground are opened.

3. The charging-discharging control apparatus of claim 1, further comprising:

a control unit configured to connect the base of the second transistor to the base of the fourth transistor and control switching of the first transistor and the third transistor using the charging signal and the discharging signal depending on a preset duty.

4. The charging-discharging control apparatus of claim 3, wherein the duty is preset depending on temperature and a voltage of the power supply unit.

5. The charging-discharging control apparatus of claim 4, wherein the DC link capacitor is completely discharged by the discharging signal input to the fourth transistor prior to turning-on the relay and is charged by the charging signal input to the second transistor to turn-on the relay.

6. A charging-discharging control apparatus of a DC link capacitor in an electric power steering relay, comprising:

a DC link capacitor configured to turn-on the electric power steering relay by charging an electric charge, a first switching unit configured to control charging of the DC link capacitor by being shorted between the DC link capacitor and a power supply unit; and a second switching unit configured to control discharging of the DC link capacitor by being shorted between the DC link capacitor and a ground, wherein the first switching unit includes at least one transistor to control the charging of the DC link capacitor using a collector current thereof, and the second switching unit includes at least one transistor to control the discharging of the DC link capacitor using a collector current thereof, wherein the first switching unit includes:

a first transistor configured to be connected to the power supply unit through a first resistor; and a second transistor configured to be connected to the first transistor through a second resistor to control a current flowing in the DC link capacitor from the power supply unit using the first transistor, and wherein a collector of the second transistor is connected to a base of the first transistor, when a charging signal is input to a base of the second transistor, the first transistor is turned-on so that the power supply unit is shorted with the DC link capacitor, and when the charging signal is not input to the base of the second transistor, the first transistor is turned-off so that the power supply unit and the DC link capacitor are opened.

7. A method of a charging-discharging control of a DC link capacitor in an electric power steering relay, comprising:

a first step of measuring a voltage of a power supply unit and an internal temperature;

a second step of determining a discharging duty depending on the measured voltage and the internal temperature;

a third step of discharging the DC link capacitor by a discharging switching unit depending on the discharging duty;

a fourth step of charging the DC link capacitor by a charging switching unit; and a fifth step of turning-on the electric power steering relay.

8. The method of claim 7, further comprising:

prior to the first step, setting the duty and storing the set duty in a lookup table so as to discharge the DC link capacitor depending on the voltage of the power supply unit and the internal temperature.

9. The method of claim 7, wherein in the third step, switching of a switching element which controls discharging of the DC link capacitor is controlled by the switching element using the discharging duty as an input.

10. The method of claim 9, wherein in the third step, the DC link capacitor is completely discharged.

11. The method of claim 7, further comprising:

prior to the fourth step, a 4-1-th step of measuring the voltage of a power supply unit and the internal temperature;

a 4-2-th step of setting a duty and storing the set duty in a lookup table so that the DC link capacitor is charged depending on the measured voltage and the internal temperature; and a 4-3-th step of determining a charging duty depending on the measured voltage and the internal temperature.

12. The method of claim 7, wherein in the fourth step, switching of a switching element which controls charging of the DC link capacitor is controlled by the switching element using the charging duty as an input.

13. The method of claim 12, wherein in the fourth step, the DC link capacitor is charged with a preset voltage.

* * * * *